(12) United States Patent
Cardin (10) Patent No.: US 11,536,703 B2
(45) Date of Patent: Dec. 27, 2022

(54) SYSTEM AND METHOD OF PRESSURE-CONTROLLED SPLITTING OF A CHEMICAL SAMPLE

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 422 days.

(21) Appl. No.: 16/663,268

(22) Filed: Oct. 24, 2019

(65) Prior Publication Data

US 2020/0132641 A1   Apr. 30, 2020

Related U.S. Application Data (60) Provisional application No. 62/750,384, filed on Oct. 25, 2018.

(51) Int. Cl.
| | |
|---|---|
| *G01N 30/72* | (2006.01) |
| *G01N 30/20* | (2006.01) |
| *G01N 30/10* | (2006.01) |

(52) U.S. Cl.
CPC ......... *G01N 30/7206* (2013.01); *G01N 30/10* (2013.01); *G01N 30/20* (2013.01)

(58) Field of Classification Search
None
See application file for complete search history.

(56) References Cited

U.S. PATENT DOCUMENTS

| | | | | |
|---|---|---|---|---|
| 4,976,750 A | * | 12/1990 | Munari | G01N 30/32 95/82 |
| 5,163,979 A | | 11/1992 | Patrick et al. | |

(Continued)

FOREIGN PATENT DOCUMENTS

| | | |
|---|---|---|
| CN | 104034828 A | 9/2014 |
| CN | 107073358 A | 8/2017 |

(Continued)

OTHER PUBLICATIONS

International Search Report received for PCT Patent Application No. PCT/US2019/057963, dated Apr. 2, 2020, 4 pages.

(Continued)

*Primary Examiner* — Daniel S Larkin
(74) *Attorney, Agent, or Firm* — Kubota & Basol LLP (57) ABSTRACT

Pressure-controlled splitting can be used to inject a chemical sample from an injection source to a detector (e.g., a mass spectrometer) for chemical analysis (e.g., gas chromatography or gas chromatography-mass spectrometry) with reduced peak widths. For example, the sample is first transferred to a first compression volume; then pressure in the system is increased to compress the sample to split it between a second compression volume and a column. The fraction of the sample split to the column can have reduced peak widths compared to the peak widths prior to compression and splitting yet can maintain the same peak height to preserve high sensitivity for trace level analysis. This portion of the sample can traverse the column and elute to the detector for analysis with reduced chemical noise. Faster injection rates can allow faster analysis times, as less separation of chemicals is needed before the sample reaches the detector.

18 Claims, 7 Drawing Sheets

(56) References Cited

U.S. PATENT DOCUMENTS

| | | | | |
|---|---|---|---|---|
| 5,339,673 | A | * 8/1994 | Nakagawa | G01N 30/10 73/23.36 |
| 5,759,234 | A | * 6/1998 | Munari | G01N 30/12 95/87 |
| 2018/0299415 | A1 | * 10/2018 | Cardin | G01N 30/6017 |

FOREIGN PATENT DOCUMENTS

| | | | |
|---|---|---|---|
| CN | 111279188 A | | 6/2020 |
| JP | H8-007195 | * | 1/1996 |
| WO | 01/55714 A1 | | 8/2001 |

OTHER PUBLICATIONS

Nakamura et al., "Determination of 2-methylisoborneol and geosmin in Aqueous Samples by Static Headspace-Gas Chromatography-Mass Spectrometry with Ramped Inlet Pressure", Journal of Separation Science, vol. 28, No. 18, XP055660870, Dec. 1, 2005, pp. 2511-2516.

* cited by examiner

SYSTEM AND METHOD OF PRESSURE-CONTROLLED SPLITTING OF A CHEMICAL SAMPLE

CROSS-REFERENCE TO RELATED APPLICATION

This application claims the benefit of U.S. Provisional Patent Application No. 62/750,384, filed on Oct. 25, 2018, the entire disclosure of which is incorporated herein by reference in its entirety for all purposes.

FIELD OF THE DISCLOSURE

This relates to a technique of injecting a sample into a gas chromatogram (GC) column and more particularly to a technique that uses controlled increases of pressure to compress and split a sample between the GC column and a separate compression volume, thereby reducing the peak widths of the sample.

BACKGROUND OF THE DISCLOSURE

Increasing the speed of gas chromatography has been the goal of a substantial amount of research over the years. Using shorter columns, thinner column coatings, faster flow rates, and faster temperature ramps can allow all compounds to elute from a GC column faster. However, the use of shorter columns with thinner coatings can reduce the resolving power of the column, which can cause peak separation to suffer. Moreover, peaks can become distorted if the sample is not evenly distributed onto the column within a short timeframe. Thus, in some situations, it can be desirable to increase the injection rate or deposition rate of the sample onto the GC column to reduce peak widths and therefore necessary resolving power of the GC column, thereby reducing the time of analysis. To increase injection rates, three techniques have been employed in the past; flow controlled splitting, pulsed splitless injections, and simply reducing the sample volume to be injected. Reducing the sample volume to be injected reduces the sensitivity of the analysis.

Flow controlled splitting uses flow and pressure controllers to set a column head pressure while also allowing a controlled amount of gas to be vented through a "split out" port. At a given temperature, carrier gas makeup, carrier gas pressure, and column configuration (e.g., length and inner diameter), the flow through the column can be calculated using the viscosity of the carrier gas at specific GC column temperatures. That is, the flow through the GC column is simply controlled by implementing the calculated pressure. Although the faster overall flow rates are increased and sample injection rates are increased, splitting using flow control splitting at constant pressures reduces the peak areas proportionately to the amount split out, thereby reducing the sensitivity of the analysis. That is, a 20:1 split use flow-controlled splitting will reduce the area of the detected peaks by roughly 20 times, although the peak height may be reduced slightly less due to the narrowing of the peak. Ramping the pressure at the time of splitting is ineffective using flow controlled splitting, as this causes inconsistent split ratios due to the inherent difficulty of trying to control the split flow rate as the pressure is changing, especially when trying to achieve low split ratios (e.g., 2:1, 3:1, or less than 10:1). If the split ratios are not consistent, then the technique will not be very reproducible, and therefore not highly quantitative.

Pulsed split-less injection increases the pressure at the time of injection to compress the sample at the head of the column. Although pulsed split-less injection has been shown to reduce peak widths, the effect is limited to about a 1.5-2× reduction in peak width, which is insufficient for many applications. In addition, pulsed splitless injections are often used with liquid solvent injections to reduce the effects of solvent expansion in the injector, but are less effective when injecting samples that are initially in the gas phase.

SUMMARY

This relates to a technique of injecting a sample into a gas chromatography (GC) column and more particularly to a technique that uses controlled increases of pressure to compress and split a sample between the GC column and a separate compression volume, thereby reducing the peak widths of the sample. The reduction in peak widths by increasing the sample injection rates reduces the time needed to resolve compounds prior to detection at the end of the GC column.

Pressure-controlled Splitting (PCS) improves the injection rate onto a GC column without reducing the signal to noise ratio at the apex of the eluting peak. The split ratio is maintained by controlling the pressure and the pressure ramp rate.

Pressure-controlled splitting reduces injection band widths during Gas Chromatography (GC) analysis which speeds up GC run times while reducing the resolving power requirements of the GC column. Just after sample injection onto a precolumn, the carrier gas pressure is rapidly increased over a short period of time to allow some of the sample to compress into both the GC column and an off-axis compression volume. This splitting reduces the peak width of each compound that passes onto the GC separation column with substantially no reduction of the intensity of each compound at the centroid of each eluting peak. Retaining the original peak height after partial splitting maintains the same signal to noise ratio as the non-compressed sample, while decreasing peak widths reduces interferences from closely eluting compounds (chemical noise). Pressure-controlled splitting allows the equivalence of a 2:1, 3:1, or 4:1 split in a way that is more reproducible than splitting using conventional flow controlled splitting techniques. Reducing peak widths without affecting peak heights can allow much faster GC run times with very little or virtually no reduction in overall sensitivity, and an improvement in accuracy by eliminating otherwise unresolved chemical interferences.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a technique of injecting a sample into a gas chromatography (GC) column and more particularly to a technique that uses controlled increases of pressure to compress and split a sample between the GC column and a separate compression volume, thereby reducing the peak widths of the sample. The reduction in peak widths by increasing the sample injection rates reduces the time needed to resolve compounds prior to detection at the end of the GC column.

Pressure-controlled Splitting (PCS) improves the injection rate onto a GC column without reducing the signal to noise ratio at the apex of the eluting peak. The split ratio is maintained by controlling the pressure and the pressure ramp rate.

Figure 1A:
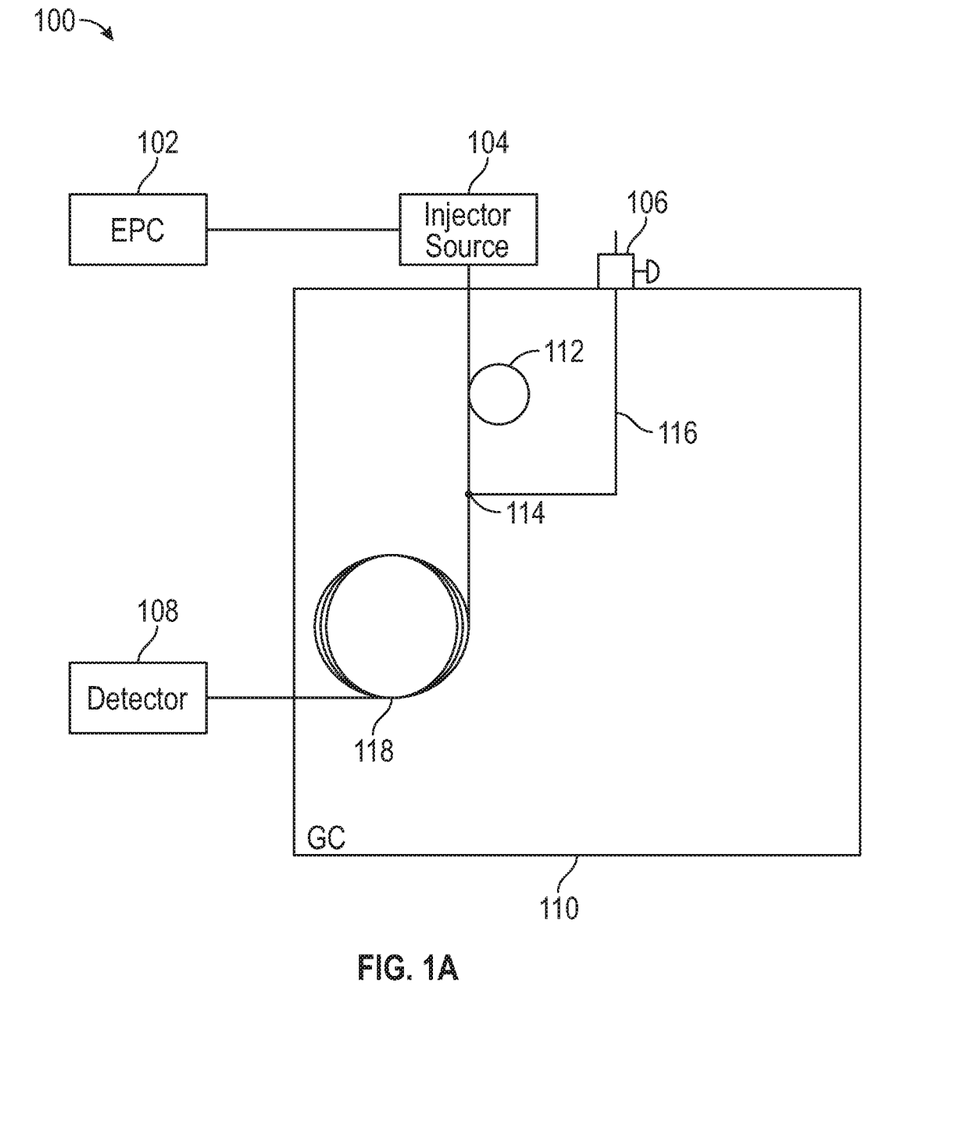
FIGS. 1A-1B illustrate exemplary systems that utilize pressure-controlled splitting according to some embodiments.
Figure 1B:
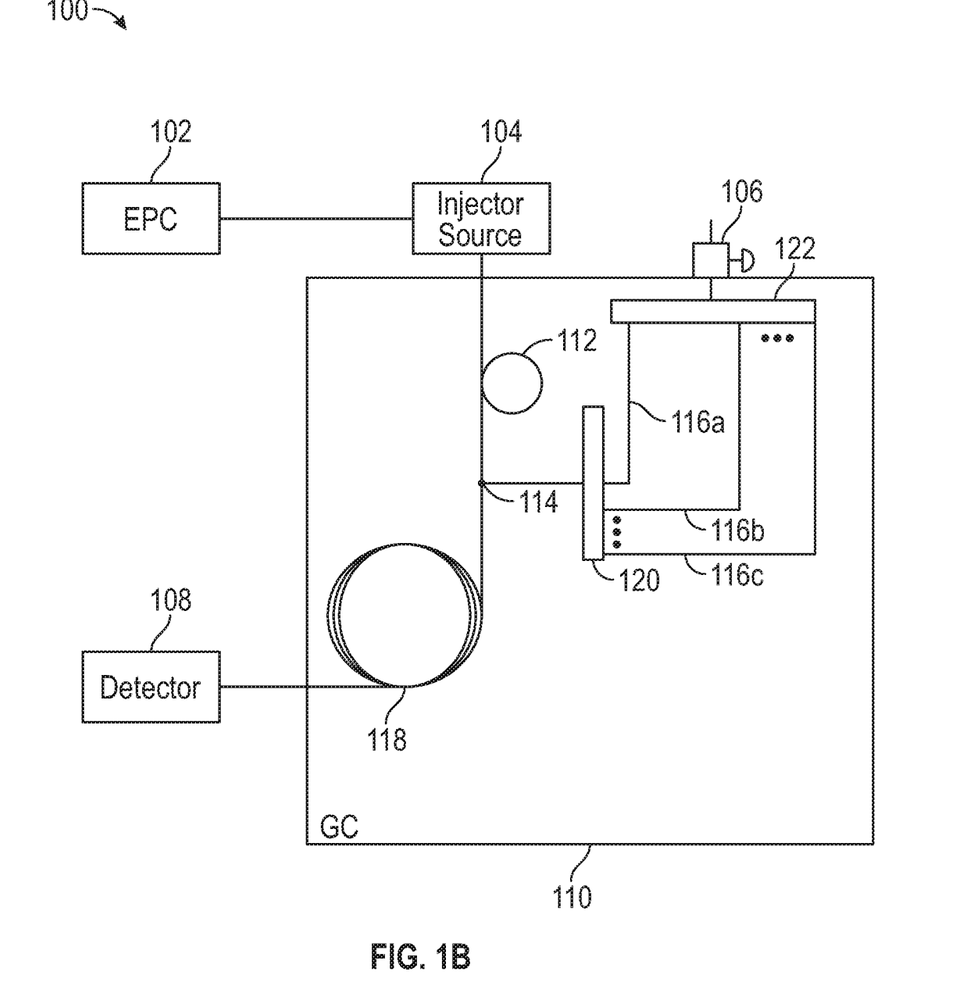

Pressure-controlled splitting reduces injection band widths during Gas Chromatography (GC) analysis which speeds up GC run times while reducing the resolving power requirements of the GC column. Just after sample injection onto a precolumn, the carrier gas pressure is rapidly increased over a short period of time to allow some of the sample to compress into both the GC column and an off-axis compression volume. This splitting reduces the peak width of each compound that passes onto the GC separation column with substantially no reduction of the intensity of each compound at the centroid of each eluting peak. Retaining the original peak height after partial splitting maintains the same signal to noise ratio as the non-compressed sample, while decreasing peak widths reduces interferences from closely eluting compounds (chemical noise). Pressure-controlled splitting allows the equivalence of a 2:1, 3:1, or 4:1 split in a way that is more reproducible than splitting using conventional flow controlled splitting techniques. Reducing peak widths without affecting peak heights can allow much faster GC run times with very little or virtually no reduction in overall sensitivity, and an improvement in accuracy by eliminating otherwise unresolved chemical interferences. FIGS. 1A-1B illustrate exemplary systems that utilize pressure-controlled splitting according to some embodiments. As shown in FIG. 1A, system 100 includes a pressure controller 102, an injector source 104, a gas chromatograph 110 including a first compression volume 112, a second compression volume 116, a split tee 114, and a GC column 118, a vent solenoid valve 106, and a detector 108 (e.g., a mass spectrometer (MS)).

The system 100 can deliver a sample through GC separation column 118 to a detector 108. Transfer of the sample through the system 100 is controlled by an electronic pressure control (EPC) system 102 that reproducibly controls pressure within approximately +/−0.01 psi. Controlling the sample flow using a highly reproducible EPC 102 allows the elution time of all compounds through the column 118 to be reproducible from run to run. It is important to allow the window of elution to be narrow and consistent to reduce the potential for mis-identification of compounds. The EPC system 102 can also increase the pressure at a steady rate, starting at a lower pressure and increasing to a higher pressure during a GC analysis, as will be described in more detail below with reference to FIGS. 2-5. Increasing the pressure can maintain a constant flow rate through the GC column 118 as the temperature increases in the GC 110 that maintains the entire column at the same temperature during the temperature ramp. As the temperature of the GC column 118 and its internal carrier gas increases, the viscosity of the gas also increases. Thus, increasing the pressure can be used to maintain a constant flow rate through the GC column 118. This gradual increase of pressure and maintenance of steady flow rate can help to prevent peak broadening throughout the entire run as the temperature may gradually increase from 35° C. to 300° C., or even higher.

The components of system 100 will now be described in more detail. Injector source 104 can contain a chemical sample prior to injection and analysis. The injection source can be a loop injection valve, a thermal desorption tube, a thermal desorption trap such as in a purge & trap system, or a multi-capillary column trap. An exemplary multi-capillary column trap is described in more detail in U.S. patent application Ser. No. 15/479,122, "MULTI-CAPILLARY COLUMN PRE-CONCENTRATION SYSTEM FOR ENHANCED SENSITIVITY IN GAS CHROMATOGRAPHY (GC) AND GAS CHROMATOGRAPHY-MASS SPECTROMETRY (GCMS)," filed Apr. 4, 2016, U.S. Patent Application Publication No. 2017/0284978, which is hereby incorporated by reference in its entirety for all purposes. In some embodiments, using pressure-controlled splitting with a multi-capillary column trap achieves peak widths that are narrower than the peak widths achieved using cryogenic focusing traps, which in turn can produce peak widths that are 50% smaller than systems using packed traps. Thus, the combination of pressure-controlled splitting and multi-capillary column traps can achieve peak widths that are 3-4 times more narrow than packed trap systems. Returning to FIG. 1A, the injector source 104 is fluidly coupled to the controller 102 and the GC 110, enabling the controller 102 to control the pressure of gas that flows through the injector source 104 and the GC 110.

The first compression volume 112 can include a transfer line that accommodates a volume of carrier gas and sample during injection of the sample. The first compression volume 112 is a section of tubing through which the sample can flow that does not include a phase or sorbent coating and is made of or coated with substantially inert materials to enable the flow of carrier gas and sample through the first compression volume 112 towards tee 114. In some embodiments, the first compression volume 112 has a volume in the range of 0.4-0.6 cc. Including the first compression volume 112 between the injector source 104 and the tee 114 allows the sample to compress within compression volume 112 instead of within the injector source 104. It is advantageous for the sample to be compressed outside of the injector source 104 because, in some situations, compressing the sample and carrier gas while the sample is within the injector source 104 can cause the sample to be trapped further within an adsorbent of the injector source 104, which can lead to peak distortion. Facilitating a low flow rate from the injector source 104 to the first compression volume 112 can allow the beginning of compression to occur only after entire sample is within first compression volume 112 (e.g., none of the sample has traversed tee 114 yet). In some embodiments, once the sample has been transferred to the first compression volume 112, the flow can be increased at a rate in the range of 2-10 cc/min/min (e.g., between 3 and 5 cc/min/min).

The second compression volume 116 can be fluidly coupled to the first compression volume 112 at one end and coupled to vent solenoid valve 106 at the other end. The second compression volume 116 can include tubing that can accommodate a portion of the sample while the vent solenoid valve 106 remains closed. From the time the sample is transferred from the injection source 104 to the first compression volume 112 until all of the sample has been transferred from the first compression volume 112 to the second compression volume 116 and the GC column 118, the vent solenoid valve 106 can be closed. Once the sample has been split between the second compression volume 116 and the GC column 118, as will be described in more detail below, the vent solenoid valve 106 can be opened to allow the split fraction of the sample that entered the second compression volume 116 to be removed from the system. In some embodiments, vent solenoid valve 106 can be replaced with a highly restrictive outlet that allows carrier gas and sample to escape the system at a flow rate 1 to 10 times less than the flow through GC column 118. In this way, the amount of flow going through the outlet can be low relative to the flow out the column 118 and, during analysis, there can be enough flow through the restrictor such that the split portion can be eliminated prior to the end of the run, where the GC oven 110 cools down and the carrier gas pressure drops back down again. As long as the GC oven temperature is increasing, the carrier gas pressure will increase to maintain a constant flow, keeping the split out sample from re-entering the GC column until removal using the split valve can be performed. After the sample traverses tee 114, vent solenoid valve 106 can be opened to allow the portion of the sample contained by the second compression volume 116 to be removed from the system 100.

The GC column 118 can be a capillary column having a length in the range of 2 to 200 meters and an inner coating about 0.1-5.0 μm thick. GC column 118 can have an inner diameter of in the range of 100-530 μm (e.g., 180-320 μm). In some embodiments, a GC column 118 with a length in the range of 2-5 meters or 15-60 meters can be used, and in some embodiments (e.g., when analyzing highly complex samples), a column with a length of 200 meters and an inner diameter of 0.25 mm can be used. As will be described in more detail below, the length, phase, and phase thickness of GC column 118 can enable faster delivery of the sample to the detector 108. In some embodiments, the detector 108 is a mass spectrometer.

The first compression volume 112, second compression volume 116, and GC column 118 are coupled by split tee 114. Coupling the first compression volume 112, second compression volume 116, and GC column 118 in this way enables a portion of the sample to elute to the GC column 118 and the remaining portion of the sample to be diverted to the second compression volume 116, as will be described in more detail.

Similar split configurations can be used to allow either a split injection when the vent solenoid valve 106 is on during injection, or a pressure-controlled split injection when the vent solenoid valve 106 is off during injection. In some situations, these split or pressure-controlled split injections are performed using a system that does not include transfer line or compression volume, such as the first compression volume 112 between the injector source 104 and the split tee 114. In some embodiments as shown in FIG. 1A, an approach is used in which the split tee 114 is positioned downstream from the first compression volume 112.

FIG. 1B illustrates another configuration of exemplary system 100 that uses pressure-controlled splitting according to some embodiments of the disclosure. As shown in FIG. 1B, system 100 can include a plurality of second compression volumes 116a-116c that are switchably couplable between tee 114 and vent solenoid valve 106 by valve systems 120 and 122. Each of the second compression volumes 116a-116c can have a unique volume, allowing the user of system 100 to select the desired volume to set the split ratio of the sample. Although FIG. 1B illustrates three exemplary second compression volumes 116a-116c, in some embodiments, a different number of second compression volumes can be provided. A range of volumes can be provided to allow selection of a split ratio in the range of 5% to 95%. An appropriate delay in the start of the pressure ramp of the carrier gas can ensure that retention times remain constant when switching between the different secondary compression volumes 116a-c, as an increase in secondary volume will increase the delivery rate through the first compression volume to the GC column 118, so this increased rate must be accounted for in order to maintain consistent retention times for the GC analysis.

Figure 2:
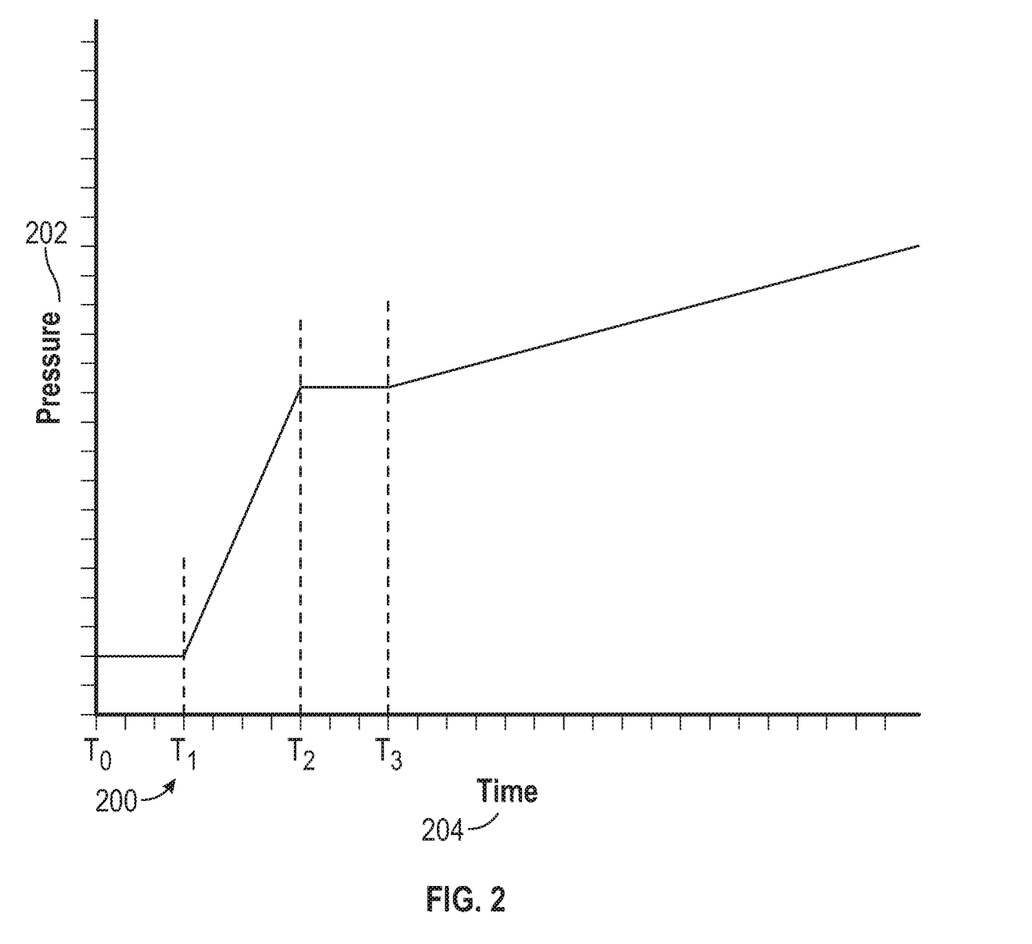
FIG. 2 illustrates an exemplary pressure profile corresponding to operation of a system in accordance with some embodiments.

FIG. 2 illustrates an exemplary pressure profile 200 corresponding to operation of the system 100 in accordance with some embodiments. In some embodiments, EPC 102 can control the pressure in system 100 according to pressure profile 200 to inject the sample into the GC column 118 in a process that compresses and splits the sample with little or no loss in sample peak height.

From $T_0$ to $T_1$, the injection is made at a low pressure (e.g., 1-5 psig) and low flow rate, allowing the entire sample to transfer to the first compression zone 112. The entire sample is transferred from the injector source 104 to the first compression zone 112 without any compounds exiting the first compression zone 112 at or before $T_1$. A slow initial flow rate can allow for any time delay in the release of the entire sample from the injector source 104, such as due to uneven heating of an adsorbent, non-laminar flow through an adsorbent during desorption, or inconsistent release rates from a multi-sorbent system when compounds are partially retained on sorbents of varying strengths. The time from $T_0$ to $T_1$ can be about 12 seconds to two minutes, depending on the time needed to transfer the sample completely from the injector source 104 into the first compression volume 112, and the volume of the first compression volume 112. In some embodiments, from $T_0$ to $T_1$, the flow rate of the carrier gas and sample can be about 0.3 cc/min and the temperature can be in the range of 30 to 50° C.

From $T_1$ to $T_2$, the pressure is increased at a steady rate to compress the sample and split a consistent fraction of the sample between the second compression zone 116 and the GC column 118. The entire sample is transferred from the first compression zone 112 to the second compression zone 116 and the GC column 118 at or before $T_2$. In some embodiments, the time between $T_1$ and $T_2$ is in the range of 6 to 30 seconds. The rate of pressure change between $T_1$ and $T_2$ and the volumes of the first compression zone 112 and the second compression zone 116 are selected such that all compounds of interest are swept through the compression split tee 114 at or before $T_2$. By $T_2$, the pressure can be in the range of 7 to 20 psig and the rate of pressure increase can be in the range of 0.06 psig/s to 9.5 psig/s or 1 cc/min/min to 8 cc/min/min. From $T_1$ to $T_2$, the temperature in the system can remain at the initial GC temperature in the range of 30 to 50° C. It is important that all compounds can traverse the tee 114 during the time from $T_1$ to $T_2$ to ensure reproducibility of the split. For example, none of the light compounds traverse tee 114 before $T_1$ and all of the heaviest compounds traverse tee 114 by $T_2$. It is important to start at a low enough pressure and flow rate at $T_1$ such that, after the compression (e.g., by $T_2$), the flow rate through the GC column 118 is at a rate that provides good separation (e.g., optimum linear velocity for the capillary GC column being used) while not exceeding the flow limitations of the detector 108. For example, a starting flow of 0.3-0.6 cc/min for a 250 μm inner diameter GC column 118 may then result in a final flow rate of 1-2 cc/min, which is still within a useable flow range for that column inner diameter.

At $T_2$, the sample begins to move through the GC column 118. From $T_2$ to $T_3$, pressure and temperature are constant. The flow rate of the sample can be about 0.8-2.0 cc/min. The time from $T_2$ to $T_3$ can be about 1-3 minutes. Between $T_2$ and $T_3$, the temperature can be in the range of 35-50° C., or as high as 100° C. and the pressure, which depends on the length and inner diameter of the GC column 118, can be in range of 5-18 psig.

Starting at $T_3$, the pressure is increased gradually as the GC 110 temperature increases to maintain a constant, predetermined flow rate through the GC column 118. Increasing the pressure and temperature at the same time creates a constant flow rate because the viscosity of the carrier gas increases with temperature. For example, the flow rate can be about 1.2-1.3 cc/min. Starting at $T_3$, the temperature can increase at a rate of 2-40° C. per minute, therefore the pressure can accordingly increase to maintain a flow rate around 1.2-1.3 cc/min, for example.

Figure 3:
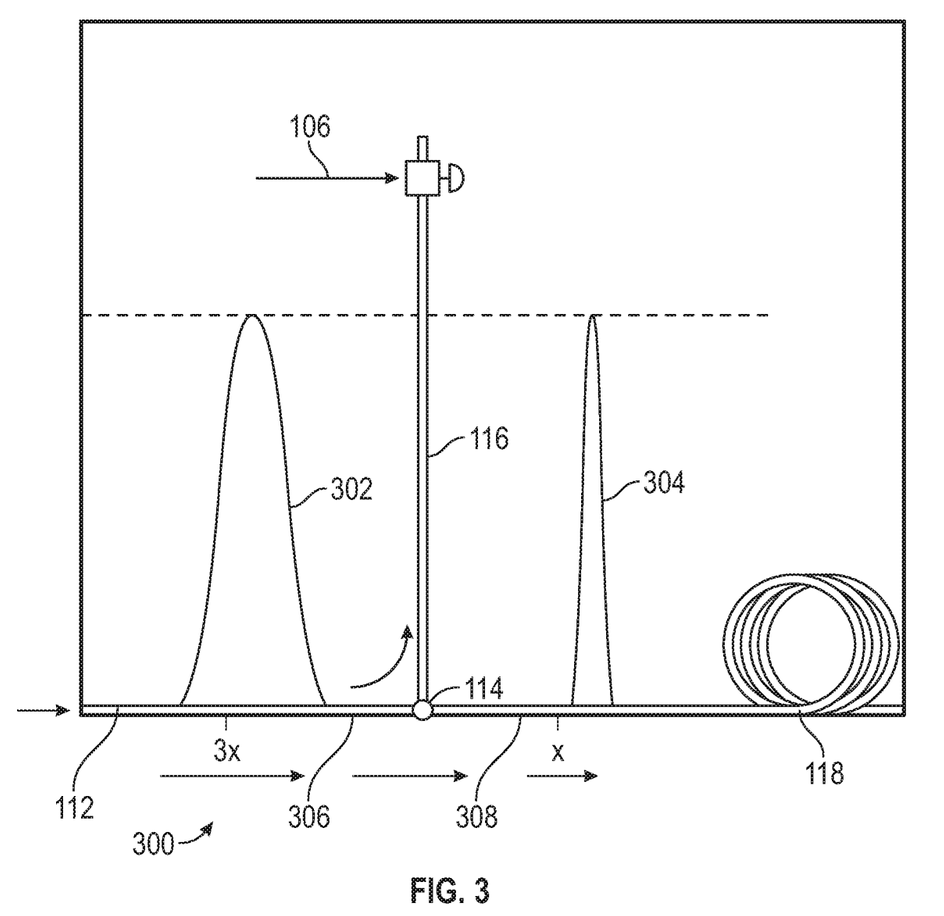
FIG. 3 is an illustration of a peak moving past split tee of a system according to some embodiments.

FIG. 3 is an illustration 300 of a peak 302-304 moving past split tee 114 of system 100 according to some embodiments. Injecting the sample into the first compression zone 112 prior to the compression split tee 114 can allow the entire sample to be completely transferred from the injector source 104 to the first compression volume 112 without beginning to traverse the tee 114 prior to increasing the pressure. This is particularly useful when the injection rate is not maximally fast, such as when the injection device is a heated thermal desorption tube. Since, in some embodiments, the release rate from the sample source may be relatively slow, or if the delivery of the sample from the injection source 104 to the first compression volume 112 may not be laminar, it can be advantageous to use a relatively low flow rate while the sample transfers from the injector source 104 to the first compression volume 112 to reduce the total volume of gas in which the sample is contained. This reducing in volume in itself maintains a more concentrated sample, in a smaller volume, which can ultimately allow faster delivery to the column 118 when compression starts. Also, the flow rate at $T_2$ can be in a range that is optimized for the inner diameter of GC column 118, so a flow much slower than optimum must be used at the start to transfer the sample from the injector source 104 to the first compression volume 112. It can be undesirable for the front of the peak to move far ahead of the back of the peak, and it can be advantageous for the entire sample to be a place where non-laminar flow and partial surface adsorption will not be an issue when the flow is increased. For example, when ramping the flow from 0.3 to 1.2 cc, temporary flow rates of 3-5 cc/min will be achieved as the downstream volumes have to be pressurized. This can substantially decrease the time in which the sample is passing the split tee, which can decrease the sample deposition time onto the GC column.

For example, it can take between 5 and 30 seconds to desorb the entire sample from the adsorbent particles of the injector source 104 and transfer the sample into the first compression zone 112, which, in some circumstances, can result in broad peaks and poor analyzer resolution. However, if a slow flow rate is used during the first 5-30 seconds of injection to allow the sample to transfer from the injector source 104 to the first compression volume 112 (e.g., between times $T_0$ and $T_1$ as shown in FIG. 2), followed by steadily increasing the pressure to compress the sample partially into the second compression volume 116 (e.g., between times $T_1$ and $T_2$ as shown in FIG. 2), the overall peak width can be reduced significantly. Once compression starts, the peaks of the chemical sample can travel much faster through the first compression volume 112 than they will through on the GC column 118, because compression and splitting take place simultaneously. During compression, the concentration of chemicals can increase relative to the volume the chemicals are contained within. Since the carrier gas has no affinity to the GC column, and very little effect on detector sensitivity, an increase in signal can be achieved. Considering the typical diffusion and band broadening of the sample that can occur on a GC column, the peak intensity achieved using pressure-controlled splitting will usually not increase relative to standard splitless injections, but rather will keep the peak intensity nearly the same as splitless injections while reducing peak widths by 2-5 times.

When a peak (e.g., peak 302 or 304) passes the compression tee 114 and flows onto the GC column 118, flow slows down considerably since some of the sample flows into the second compression volume 116. The decrease in flow allows the back of the peak to catch up to the front of the peak, reducing the peak in width by 2-5 times depending on the compression volumes and pressure increases used. For example, peak 302 is three times as wide as peak 304 when it is before the split tee 114 than when it is past the split tee 114 when delivered onto the GC column 118. In some embodiments, this technique does not have the effect of reducing the peak height of the peaks. For example, peak 302 and peak 304 have the same height. Conservation of peak height helps to preserve the signal to noise ratio, even though some of the sample has been removed (e.g., transferred to the second compression volume 116 to later be removed from the system, instead of being injected into GC column 118). The reduction of peak width with the preservation of peak height can reduce chemical noise, as will be described further with reference to FIGS. 4A-4B. After the pressure-controlled splitting has occurred and all compounds of interest are on the GC column 118, the vent solenoid valve 106 can be opened, thereby eliminating the part of the sample that was compressed into the second compression volume 116 during the pressure increase and peak compression. Alternatively, in some embodiments, vent solenoid valve 106 can be replaced with a flow-restricting outlet as described above.

In some embodiments, increasing the volume of the second compression volume 116 can increase the injection rate, though the use of a second compression volume 116 with a volume that is too large may reduce the peak height. For example, on a 60 m×0.25 mm column at 1.2 cc/min, a peak might widen by 0.2 seconds per minute on the column once the GC 110 achieves a temperature where a compound is only partially retained on the column 118. Therefore, if a peak elutes in 3 minutes, and its injection time was brought down to 3 seconds, it may have a peak width at the detector of 3.6 seconds. If 98% of the sample is split out to the second compression volume 116, injection time could be about 0.1 second and the peak width could be about 0.7 seconds because it would still have the about 0.6 second band broadening due to diffusion, for example. For thicker films, the amount of diffusion as the samples passes through a column can be greater, as it will be for larger diameter columns. For the example of injecting the sample in 0.1 second and broadening the peak to 0.7 seconds, the increase in peak width is 700%, whereas for the example of broadening a peak from 3 seconds to 3.6 seconds, it's only a 20% increase. Therefore, in the 2-4 split pressure controlled splitting range, the decrease in peak height caused by diffusive band broadening can be similar to the increase in peak height due to compression of the sample, resulting in no or substantially no overall change to the peak height relative to the non-pressure controlled split peak.

Figure 4A:
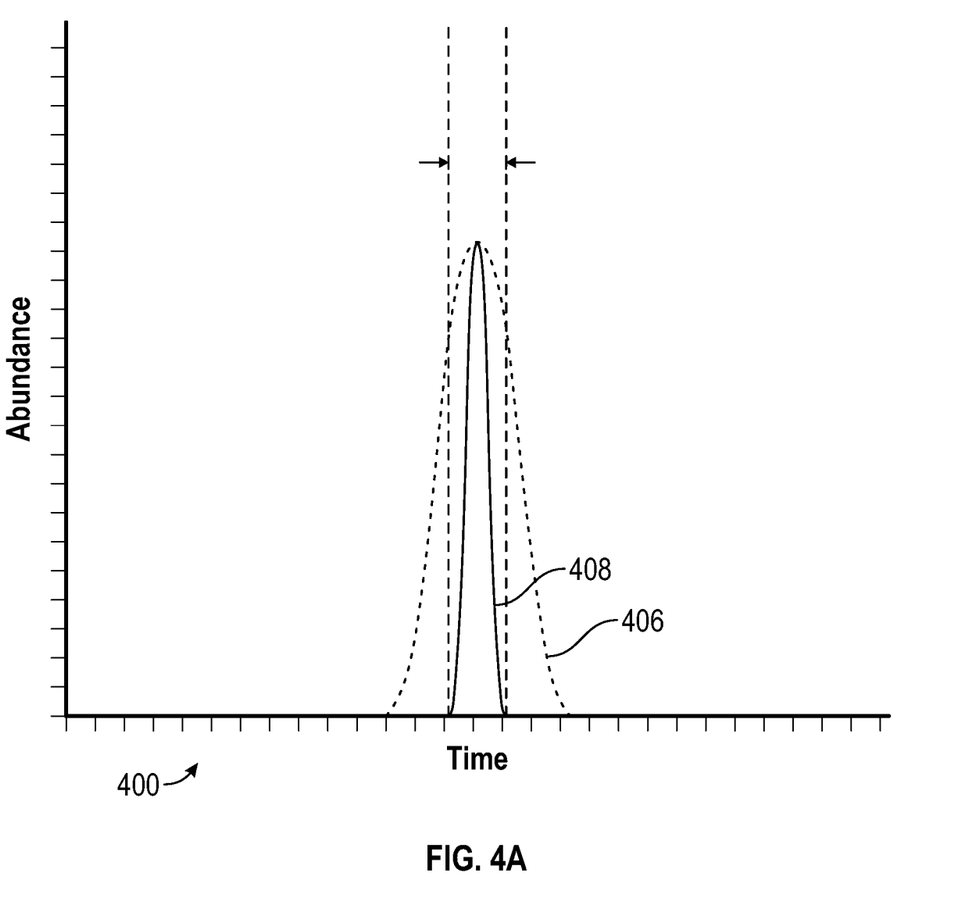
FIGS. 4A-4B illustrate exemplary partial chromatographs with and without pressure-controlled splitting in accordance with some embodiments.
Figure 4B:
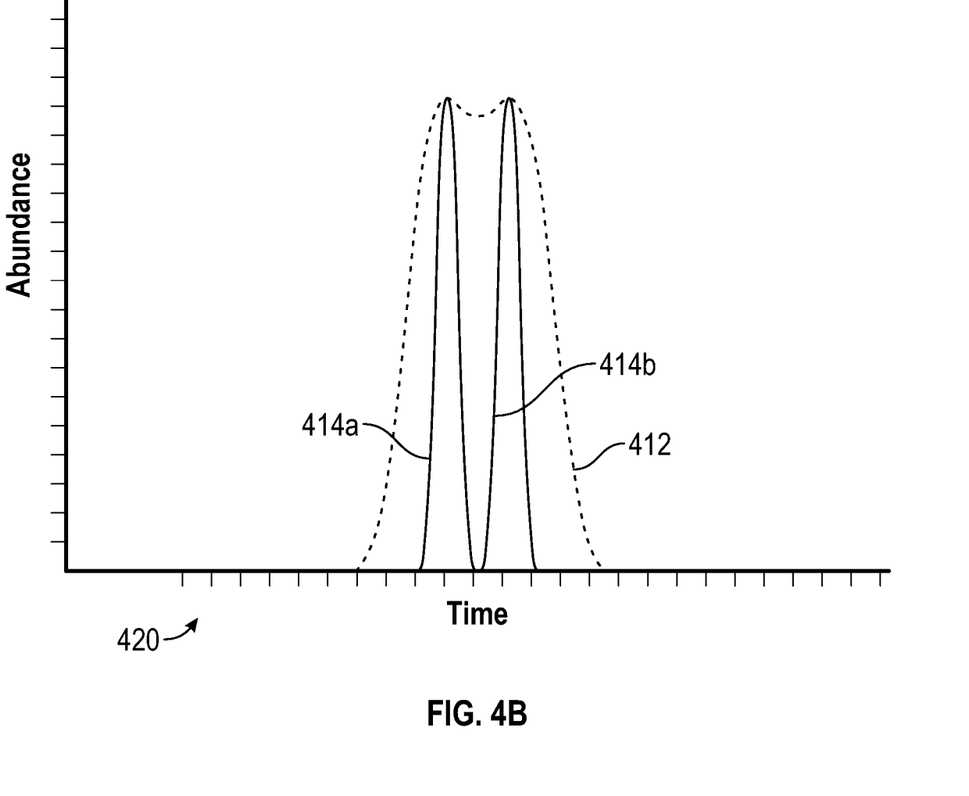

FIGS. 4A-4B illustrate exemplary partial chromatographs 400 and 420 with and without pressure-controlled splitting in accordance with some embodiments. FIG. 4A illustrates an overlay of a peak 406 without pressure-controlled splitting and a peak 408 with pressure-controlled splitting. The concentration at the apex or centroid of the peaks 406 and 408 is substantially the same magnitude, because of simultaneous splitting and pressure-induced compression. In some embodiments, performing fast GC on the resulting narrower peak 408 prevents it from broadening as much due to diffusion on the GC column 118. The narrow peak widths can be maintained by using columns of shorter length (e.g., 30 m instead of 60 m), with thinner film thicknesses (e.g. 0.5 μm instead of 1-2 μm), and with faster flow rates and rates of temperature increase inside the GC 110. Because the peak 408 is narrower than peak 406, less separation by the column 118 is needed, so shorter analysis times are possible.

FIG. 4B illustrates the effect of pressure-controlled splitting on two closely-eluting compounds that would have substantially co-eluted without pressure-controlled splitting. Without pressure-controlled splitting, these compounds appear as a single, almost completely unresolved, peak 412 on chromatograph 420. With pressure-controlled splitting, two distinct peaks 414a and 414b appear. Each compound can act as chemical noise relative to quantifying the other compound without pressure-controlled splitting. Thus, pressure-controlled splitting can both reduce GC analysis times, and can reduce noise or incorrect quantitation due to interferences from closely eluting compounds.

Figure 5:
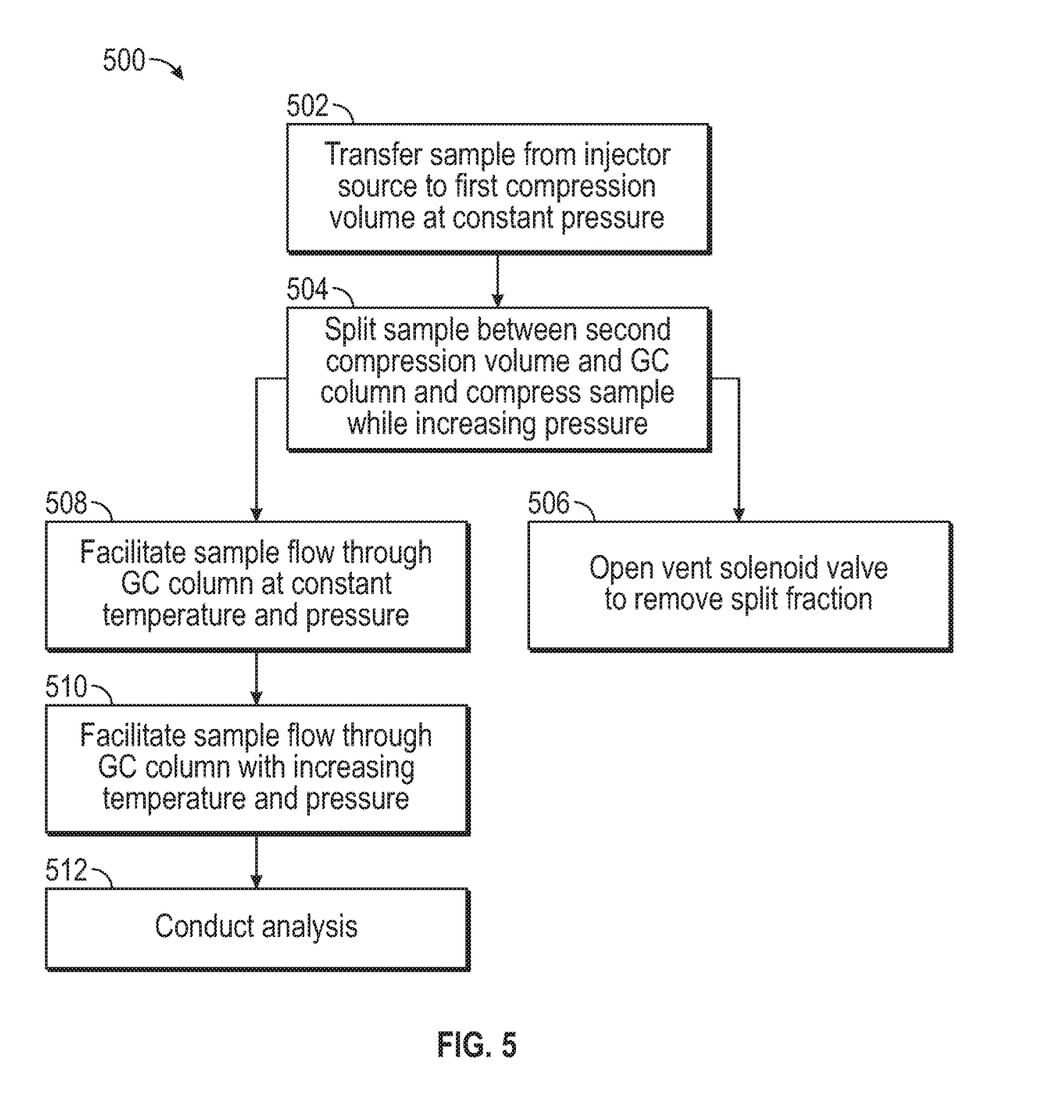
FIG. 5 illustrates an exemplary process for performing pressure controlled splitting according to some embodiments.

FIG. 5 illustrates an exemplary process 500 for performing pressure controlled splitting according to some embodiments. Process 500 can be performed according to one or more embodiments described above with reference to FIGS. 1A-4B. In some embodiments, a non-transitory computer-readable storage medium can store instructions that, when executed by one or more processors, causes the processors to cause a system to perform one or operations of process 500.

At 502, the sample can be transferred from the injector source 104 to the first compression volume 112 while the system pressure is constant. Transfer can be completed during times $T_0$ to $T_1$ described above with reference to FIG. 2.

At 504, the sample can be split between the second compression 116 volume and the GC column 118, such as from $T_1$ to $T_2$ described above with reference to FIG. 2. During this time, the pressure can be steadily increased, causing the sample to compress as it moves past tee 114, splitting between the second compression volume 116 and the GC column 118. The entire sample moves past tee 114 while the pressure is being steadily increased.

At 506, vent solenoid valve 106 can be opened. Opening the vent solenoid valve 106 can allow the fraction of the sample that was split to the second compression volume 116 to be removed from the system 100. In some embodiments, action 506 is not performed. For example, vent solenoid valve 106 can be replaced with a restrictive outlet that allows the split fraction of the sample to flow out of the second compression volume 116 at a relatively low flow rate while the rest of process 500 proceeds.

Before, after, or during 506, at 508, the system 100 facilitates flow of the fraction of the sample spilt to the GC column 118 through the GC column 118. The flow of the sample through GC column 118 at constant pressure can occur at $T_2$ to $T_3$ described with reference to FIG. 2. This isothermal period can provide time for relatively unretained compounds to interact with the GC column 118 to improve separation of compounds at the GC starting temperature, but this period can be brief enough (e.g., 1-5 min) so that no band-broadening of the peaks are evident.

At 510, the system 100 pressure and temperature gradually increases as the sample continues to move through the GC column. The increase in pressure and temperature occurs from $T_3$ onward as described with reference to FIG. 2. The increase in pressure can account for the increase in carrier gas viscosity as the oven temperature increases such that the flow rate can remain constant or substantially constant throughout the run, allowing shorter run times and less peak broadening relative to constant pressure operation as the GC oven temperature increases.

At 512, the detector 108 conducts chemical analysis of the sample as the compounds elute from the GC column 118. As described above with reference to FIGS. 4A-4B, the peaks of the sample compounds are narrower than they would have been without the use of pressure-controlled splitting, thus reducing chemical noise in the resulting data without decreasing sensitivity.

Some embodiments can be used to improve the accuracy and reduce the analysis times of hundreds of GC applications. The ability to use highly accurate pressure control and pressure ramping to effect accurate splitting in the range of 1.1 to 5 times (e.g., 2-4 times) gives the analytical GC chemist a powerful tool to substantially improve GC resolution to increase the speed of analysis. Pressure-controlled splitting can be used in many fields that use GC or GCMS, including Environmental, Food and Flavor, Product Testing, Aroma and Fragrance analysis, Petroleum and Petrochemical, Forensics, and Clinical Analysis. In particular, sample introduction rates that are limited by the rate of release onto the column or into a transfer line leading to a column can be improved significantly. This includes the thermal desorption of an adsorbent tube containing a sample, which can significantly increase injection rates without a reduction in the overall sensitivity of the method which would other result when using normal split injections.

Therefore, according to the above, some examples of the disclosure are directed to a method, comprising: transferring a sample from an injector source of a system to a first compression volume; increasing pressure in the system at a steady rate while splitting the sample into a first portion that is transferred to a column of the system and a second portion that is transferred to a second compression volume of the system, wherein the first compression volume, the second compression volume, and the column are coupled by a tee; separating chemical compounds of the sample from one another as a first portion of the sample moves through the column; and conducting chemical analysis of the first portion of the sample with a detector. Additionally or alternatively, in some examples a width of a peak of the sample decreases as the peak moves past the tee, and a height of the peak remains substantially constant as the peak moves past the tee. Additionally or alternatively, in some examples the method further includes opening a vent solenoid valve that is fluidly coupled to the second compression volume to remove the second portion of the sample from the system. Additionally or alternatively, in some examples the vent solenoid valve is opened after the entire sample is split between the column and the second compression volume. Additionally or alternatively, in some examples a restricting outlet is coupled fluidly coupled to the second compression volume, and the restricting outlet is configured to allow gas to exit the system at a flow rate that is lower than a flow rate of gas through the column. Additionally or alternatively, in some examples the entire sample traverses a tee that connects the first compression volume, the second compression volume, and the column while the pressure is increasing. Additionally or alternatively, in some examples conducting chemical analysis of the first portion of the sample includes performing gas chromatography-mass spectrometry (GC-MS). Additionally or alternatively, in some examples the method further includes selecting the second compression volume from a plurality of compression volumes, each of the plurality of compression volumes having a unique volume and being switchably couplable to the first compression volume and the column. Additionally or alternatively, in some examples increasing the pressure in the system is performed such that an injection rate of the sample into the detector increases, wherein the detector comprises one of a gas chromatography analyzer and a gas chromatography-mass spectrometry analyzer.

Some examples of the disclosure are directed to a system, comprising an injector source; a first compression volume fluidly coupled to the injector source at a first end of the first compression volume; a second compression volume; a column; a tee fluidly connecting a second end of the first compression volume, the second compression volume, and the column; a detector; and an electronic pressure controller configured to: transfer a sample from an injector source of a system to a first compression volume; and increase pressure in the system at a steady rate while splitting the sample between a second compression volume and a column, wherein: the column is configured to separate chemical compounds of the sample from one another as a first portion of the sample moves through the column, and the detector is configured to conduct chemical analysis of the first portion of the sample. Additionally or alternatively, in some examples a width of a peak of the sample decreases as the peak moves past the tee, and a height of the peak remains substantially constant as the peak moves past the tee. Additionally or alternatively, in some examples the system further includes a vent solenoid valve that is fluidly coupled to the second compression volume, wherein opening the vent solenoid valve allows the second portion of the sample to be removed from the system. Additionally or alternatively, in some examples the vent solenoid valve is configured to be opened after the entire sample is split between the column and the second compression volume. Additionally or alternatively, in some examples the system further includes a restricting outlet that is fluidly coupled to the second compression volume, wherein the restricting outlet is configured to allow gas to exit the system at a flow rate that is lower than a flow rate of gas through the column. Additionally or alternatively, in some examples the entire sample traverses a tee that connects the first compression volume, the second compression volume, and the column while the pressure is increasing. Additionally or alternatively, in some examples conducting chemical analysis of the first portion of the sample includes performing gas chromatography-mass spectrometry (GC-MS). Additionally or alternatively, in some examples the system further includes a plurality of compression volumes including the second compression volume, each of the plurality of compression volumes having a unique volume and being switchably couplable to the first compression volume and the column. Additionally or alternatively, in some examples the electronic pressure controller is configured to increase the pressure in the system is performed such that an injection rate of the sample into the detector increases, wherein the detector comprises one of a gas chromatography analyzer and a gas chromatography-mass spectrometry analyzer.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method, comprising:
transferring a sample from an injector source of a system to a first compression volume;
increasing pressure in the system at a controlled rate while splitting the sample into a first portion that is transferred to a column of the system and a second portion that is transferred to a second compression volume of the system, wherein the first compression volume, the second compression volume, and the column are coupled by a tee;
separating chemical compounds of the sample from one another as a first portion of the sample moves through the column; and
conducting chemical analysis of the first portion of the sample with a detector.

2. The method of claim 1, wherein a width of a peak of the sample decreases as the peak moves past the tee, and a height of the peak remains substantially constant as the peak moves past the tee.

3. The method of claim 1, further comprising:
opening a vent solenoid valve that is fluidly coupled to the second compression volume to remove the second portion of the sample from the system.

4. The method of claim 3, wherein the vent solenoid valve is opened after an entirety of the sample is split between the column and the second compression volume.

5. The method of claim 1, wherein a restricting outlet is fluidly coupled to the second compression volume, and the restricting outlet is configured to allow gas to exit the system at a flow rate that is lower than a flow rate of gas through the column.

6. The method of claim 1, wherein an entirety of the sample traverses the tee while the pressure is increasing.

7. The method of claim 1, wherein conducting chemical analysis of the first portion of the sample includes performing gas chromatography-mass spectrometry (GC-MS).

8. The method of claim 1 further comprising:
selecting the second compression volume from a plurality of compression volumes, each of the plurality of compression volumes having a unique volume and being switchably couplable to the first compression volume and the column.

9. The method of claim 1, wherein increasing the pressure in the system is performed such that an injection rate of the sample into the detector increases, wherein the detector comprises one of a gas chromatography analyzer and a gas chromatography-mass spectrometry analyzer.

10. A system, comprising:
an injector source;
a first compression volume fluidly coupled to the injector source at a first end of the first compression volume;
a second compression volume;
a column;
a tee fluidly connecting a second end of the first compression volume, the second compression volume, and the column;

a detector; and an electronic pressure controller configured to:
   transfer a sample from the injector source of the system to the first compression volume; and
   increase pressure in the system at a controlled rate while the system splits the sample between the second compression volume and the column, wherein:
the column is configured to separate chemical compounds of the sample from one another as a first portion of the sample moves through the column, and
the detector is configured to conduct chemical analysis of the first portion of the sample.

11. The system of claim 10, wherein a width of a peak of the sample decreases as the peak moves past the tee, and a height of the peak remains substantially constant as the peak moves past the tee.

12. The system of claim 10, further comprising:
a vent solenoid valve that is fluidly coupled to the second compression volume, wherein opening the vent solenoid valve allows the second portion of the sample to be removed from the system.

13. The system of claim 12, wherein the vent solenoid valve is configured to be opened after an entirety of the sample is split between the column and the second compression volume.

14. The system of claim 10, further comprising:
a restricting outlet that is fluidly coupled to the second compression volume, wherein the restricting outlet is configured to allow gas to exit the system at a flow rate that is lower than a flow rate of gas through the column.

15. The system of claim 10, wherein an entirety of the sample traverses a tee that connects the first compression volume, the second compression volume, and the column while the pressure is increasing.

16. The system of claim 10, wherein conducting chemical analysis of the first portion of the sample includes performing gas chromatography-mass spectrometry (GC-MS).

17. The system of claim 10, further comprising:
a plurality of compression volumes including the second compression volume, each of the plurality of compression volumes having a unique volume and being switchably couplable to the first compression volume and the column.

18. The system of claim 10, wherein the electronic pressure controller is configured to increase the pressure in the system such that an injection rate of the sample into the detector increases, wherein the detector comprises one of a gas chromatography analyzer and a gas chromatography-mass spectrometry analyzer.

* * * * *